United States Patent
Kikuchi et al.

(10) Patent No.: US 7,283,451 B2
(45) Date of Patent: Oct. 16, 2007

(54) OBJECTIVE LENS, OPTICAL HEAD APPARATUS, OPTICAL INFORMATION RECORDING/REPRODUCING APPARATUS

(75) Inventors: Atsuo Kikuchi, Osaka (JP); Hideki Hayashi, Nara (JP); Sadao Mizuno, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 472 days.

(21) Appl. No.: 10/473,934

(22) PCT Filed: Apr. 17, 2002

(86) PCT No.: PCT/JP02/03794
§ 371 (c)(1),
(2), (4) Date: Oct. 3, 2003

(87) PCT Pub. No.: WO02/086577
PCT Pub. Date: Oct. 31, 2002

(65) Prior Publication Data
US 2004/0120052 A1 Jun. 24, 2004

(30) Foreign Application Priority Data
Apr. 17, 2001 (JP) ............................. 2001-117844

(51) Int. Cl.
*G11B 7/135* (2006.01)
(52) U.S. Cl. .................... 369/112.13; 369/112.08
(58) Field of Classification Search .............. None
See application file for complete search history.

(56) References Cited
U.S. PATENT DOCUMENTS
6,091,691 A 7/2000 Yoo et al.
(Continued)

FOREIGN PATENT DOCUMENTS
JP 10-143905 5/1998
(Continued)

OTHER PUBLICATIONS
Official translation of WO 01/26104.*
English abstract and machine translation of JP 2000-028917 A.*

*Primary Examiner*—William Korzuch
*Assistant Examiner*—Nathan Danielsen
(74) *Attorney, Agent, or Firm*—Hamre, Schumann, Mueller & Larson, P.C.

(57) ABSTRACT

An objective lens for converging a light beam emitted from a first light source on a recording surface (17a) of a first optical information recording medium covered with a transparent substrate (7a) and converging a light beam emitted from a second light source on a recording surface (17b) of a second optical information recording medium covered with a transparent substrate (7b) having a thickness greater than the transparent substrate (7a). On an incident plane for the light beam, there are formed a center region (A1), an intermediate region (A2) surrounding the center region (A1), and a peripheral region (A3) surrounding the intermediate region (A2). A diffraction grating (11) is provided on the lens surface of the intermediate region (A2). Between the intermediate region (A2) and the center region (A1), and also between the intermediate region (A2) and the peripheral region (A3), stepped portions (12) are provided for causing an advance or a delay of a phase of a light beam passing through the intermediate region (A2) with respect to the phases of the light beams passing through the center region (A1) and the peripheral region (A3). The stepped portions (12) are formed so that a value of a tertiary spherical aberration on the recording surface (17b) of the second optical information recording medium becomes a value that makes a jitter value of a reproduction signal from the second optical information recording medium not more than 15%.

10 Claims, 9 Drawing Sheets

U.S. PATENT DOCUMENTS

| | | |
|---|---|---|
| 6,285,646 B1 | 9/2001 | Yoo et al. |
| 6,370,103 B1 * | 4/2002 | Yamazaki et al. ..... 369/112.08 |
| 6,671,247 B1 * | 12/2003 | Arai et al. ............ 369/112.08 |
| 6,687,209 B2 * | 2/2004 | Ota et al. .............. 369/112.08 |
| 6,717,906 B1 * | 4/2004 | Shimano ................ 369/112.26 |
| 2002/0003767 A1 | 1/2002 | Ota et al. |

FOREIGN PATENT DOCUMENTS

| | | |
|---|---|---|
| JP | 11-344666 | 12/1999 |
| JP | 2000-28917 | 1/2000 |
| JP | 2000028917 A * | 1/2000 |
| WO | WO 0126104 A1 * | 4/2001 |

* cited by examiner

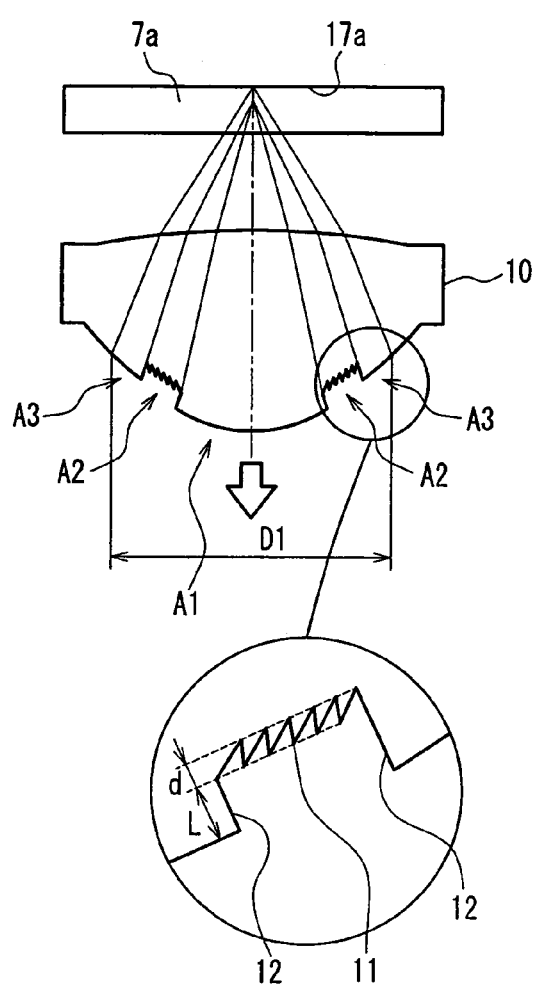
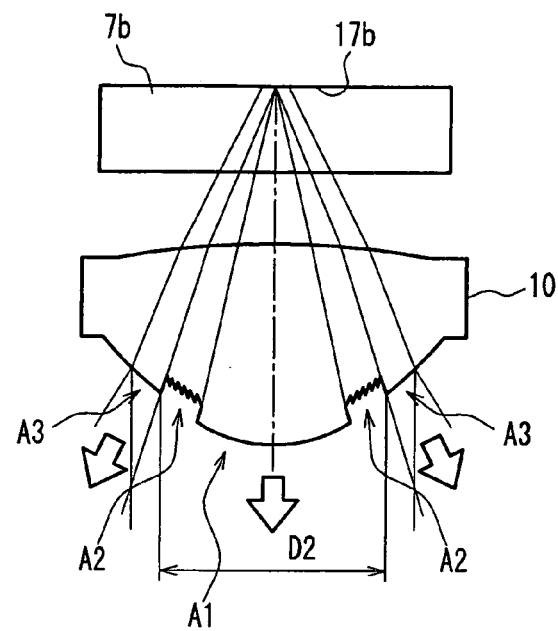
FIG. 2A
FIG. 2B

OBJECTIVE LENS, OPTICAL HEAD APPARATUS, OPTICAL INFORMATION RECORDING/REPRODUCING APPARATUS

TECHNICAL FIELD

The present invention relates to an objective lens for converging light beams on recording surfaces of various kinds of optical information recording media, and an optical head apparatus and an optical information recording/reproducing apparatus using the same.

BACKGROUND ART

Various optical systems, such as optical pick-up apparatuses for recording and reproducing information on optical information recording media such as CDs (compact disks), have been known. In addition to that, DVDs (digital video disks), which are similar in terms of size to conventional CDs and enhanced in terms of capacity, have been developed recently.

In comparing a CD and a DVD, an infrared semiconductor laser having an optical wavelength of substantially 0.78 µm is used for a CD, while a red semiconductor laser having an optical wavelength of 0.63 µm to 0.65 µm is used for a DVD. In a DVD, a numerical aperture (hereinafter, abbreviated as NA) of an objective lens of an optical pick-up is set to 0.6, and the thickness of its transparent substrate is set to 0.6 mm, or half of a conventional CD. Furthermore, a DVD has a track pitch of 0.74 µm and a shortest pit length of 0.4 µm. A CD has a track pitch of 1.6 µm and a shortest pit length of 0.83 µm, that is, about as twice those of a DVD. Namely, a DVD has higher density than a CD.

As mentioned above, various optical disks different from each other in the substrate thickness, the recording density, and the working wavelength are on the market, and thus objective lenses that can correspond to various optical disks have been proposed. For example, JP 10(1998)-143905 A describes an optical head apparatus that divides a light beam converged by an objective lens into a plurality of light beams, optimizing a light beam at a ring-shaped portion with respect to a CD, while forming a spot with a light beam positioned other than the ring-shaped portion and optimizing with respect to a DVD. The above-mentioned optical head apparatus is described further by referring to FIGS. 12 and 13.

FIG. 12 shows a conventional optical head apparatus and an optical information recording/reproducing apparatus. The optical head apparatus shown in this figure is substantially as same as an optical head apparatus described in JP 10(1998)-143905 A. FIG. 13A is a cross-sectional view showing an objective lens shown in FIG. 12 and also a light beam passing through a DVD as an optical disk. FIG. 13B is a cross-sectional view showing an objective lens shown in FIG. 12 and also a light beam passing through a CD as an optical disk.

A structure of a conventional optical head apparatus and an optical system will be described below, referring to FIG. 12. For example, when playing an optical disk 7 as a DVD, a light beam 2 having a wavelength of 650 nm is emitted from a semiconductor laser 1. The light beam 2 passes through a beam splitter 33, a collimator lens 3 and a beam splitter 5 in this order, and it is converged on the optical disk 7 by an objective lens 20. The light beam reflected by the optical disk 7 was reflected by the beam splitter 5 and received by a photodetector 4. The photodetector 4 has a photoreceptor, and thus the reflected light received by the photodetector 4 is converted into an electric signal.

When playing a CD as an optical disk 7, a light beam 32 having a wavelength of 780 nm is emitted from a semiconductor laser 31. The light beam 32 is reflected by the beam splitter 33, and converged on the optical disk 7 by the objective lens 20 in the same manner as the case of the light beam 2 used for playing a DVD. The light beam 32 reflected by the optical disk 7 is reflected further by the beam splitter 5, received by the photodetector 4 and converted into an electric signal.

Furthermore, a disk discrimination circuit 23 for discriminating the type of the optical disk 7 and a reproduction signal circuit 24 for selectively reading information of the electric signal corresponding to the type of the optical disk 7 are connected to the optical head apparatus shown in FIG. 12, thereby configuring an optical information recording/reproducing apparatus. In FIG. 12, 6 denotes a mirror for directing a light beam upwards, 8 denotes a detection lens, 9 denotes an astigmatism generator, 21 denotes an actuator for adjusting focuses of the objective lens, and 22 denotes an actuator (ACT) driving circuit.

The objective lens 20 shown in FIG. 12 has a characteristic portion on at least either of an incident plane or an emission plane. Specifically, as shown in FIGS. 13A and 13B, the objective lens is provided with an intermediate region A2 formed on the incident plane for a light beam. The intermediate region A2 is shaped like a doughnut or a ring having an outer diameter smaller than the entire effective diameter with respect to an optical path region. The interior of the intermediate region A2 makes a center region A1, and the exterior of the intermediate region A2 makes a peripheral region A3.

As shown in FIG. 13A, the center region A1 and the peripheral region A3 have optimized curvatures respectively, and thus when a light beam 2 having a wavelength of 650 nm enters, focusing is obtained on a recording surface of a DVD covered with a transparent substrate 7a. As shown in FIG. 13B, the intermediate region A2 has an optimized curvature, and thus when a light beam 32 having a wavelength of 780 nm enters, focusing is obtained on a recording surface of a CD covered with a transparent substrate 7b that is thicker than the transparent substrate 7a.

The intermediate region A2 is provided to form stepped portions between the intermediate region A2 and the center region A1, and also between the intermediate region A2 and the peripheral region A3. Therefore, an advance or a delay is generated in a phase of a light beam passing through the intermediate region A2 with respect to phases of light beams passing through the center region A1 and the peripheral region A3, thereby suppressing generation of a wavefront aberration on the recording surface of the disk 7.

As mentioned above, the objective lens 20 as shown in FIG. 13A or 13B can be used alone for both a DVD and a CD. Arrows in FIGS. 13A and 13B indicate traveling directions of light beams reflected on the recording surfaces of the optical disks. D1 in FIG. 13A indicates a light beam reflected on a recording surface of a DVD, and D2 in FIG. 13B indicates a light beam reflected on a recording surface of a CD.

However, such a conventional optical head apparatus causes a problem as shown in FIG. 13A. Namely, a light beam passing through the intermediate region A2 of the objective lens 20 does not contribute to recording or reproducing during a recording and a playback of a DVD, and thus an efficiency of a laser beam emitted from the semiconductor laser 1 is low.

For a conventional optical head apparatus, a spherical aberration will be generated on a recording surface of a CD due to a light beam passing through the center region A1 of the objective lens 20 during a playback from the CD. As a result, the reproduction signal will deteriorate since the spherical aberration is not subjected to any substantial correction.

An object of the present invention is to provide an objective lens, an optical head apparatus and an optical information recording/reproducing apparatus, which can serve to improve optical efficiency during a playback of an optical information recording medium having a thin transparent substrate, and also suppress deterioration in a reproduction signal during a playback of an optical information recording medium having a thick transparent substrate.

DISCLOSURE OF INVENTION

For obtaining the above-mentioned object, an objective lens according to the present invention converges a light beam from a first light source on a recording surface of a first optical information recording medium covered with a transparent substrate, and also converges, on a recording surface of a second optical information recording medium covered with a transparent substrate thicker than the above-mentioned transparent substrate on the first optical information recording medium, a light beam that is emitted from a second light source and different in the wavelength from the light beam emitted from the first light source. The objective lens has, on either of an incident plane or an emission plane for the two light beams, a center region where central axes of the two light beams pass through, an intermediate region formed to surround the center region, and a peripheral region formed to surround the intermediate region. The intermediate region has a diffraction structure on its lens surface, and in boundaries with the center region and also with the peripheral region, it has stepped portions to cause an advance or a delay of a phase of a light beam passing through the intermediate region with respect to phases of light beams passing through the center region and the peripheral region. The stepped portions are formed so that the value of the tertiary spherical aberration on the recording surface of the second optical recording medium becomes a value that makes a jitter value of a reproduction signal from the second optical information recording medium not more than 15%.

Conventionally, a light beam passing through an intermediate region is used only during a playback of a CD. According to this configuration, the objective lens of the present invention enables use of such a light beam not only during a playback of a CD but also during a playback of a DVD, thereby improving the optical efficiency. Furthermore, since stepped portions are formed between the intermediate region and the center region and also between the intermediate region and the peripheral region in order to decrease the spherical aberration on the recording surface of the CD during a playback of the CD, quality of a detection signal during a playback of the CD can be improved in comparison with a conventional objective lens.

It is preferable in the objective lens according to the present invention that the jitter value of the reproduction signal from the second optical information recording medium is not more than 5%. It is also preferable that the stepped portions are formed so that a value of the tertiary spherical aberration on the recording surface of the second optical information recording medium is more than −30 mλ and less than 30 mλ. It is further preferable that a numerical aperture in the intermediate region is from 0.39 to 0.47.

For the objective lens of the present invention, it is possible to lower the jitter value of the reproduction signal from the first optical information recording medium when θ1 satisfies the following formula (1). Here, θ1 denotes an advance or a delay of a phase of a light beam passing through the intermediate region formed due to the stepped portions when converging a light beam from the first light source on a recording surface of the first optical information recording medium. In the formula (1), M1 is an integer.

$$M1 \times 360 \text{ degrees} - 50 \text{ degrees} < \theta 1 < M1 \times 360 \text{ degrees} + 50 \text{ degrees} \quad (1)$$

For the objective lens of the present invention, it is also possible to lower the jitter value of the reproduction signal from the second optical information recording medium when θ2 satisfies the following formula (2). Here, θ2 denotes an advance or a delay of a phase of a light beam passing through the intermediate region formed due to the stepped portions when converging a light beam from the second light source on a recording surface of the second optical information recording medium. In the formula (2), M2 is an integer.

$$M2 \times 360 \text{ degrees} - 160 \text{ degrees} < \theta 2 < M2 \times 360 \text{ degrees} - 60 \text{ degrees} \quad (2)$$

It is preferable in the above formulas (1) and (2) that M1=−4 and M2=−3.

For the above-mentioned objective lens, an example of the first optical information recording medium is an optical information recording medium having a recording surface covered with a transparent substrate having a thickness of about 0.6 mm, e.g., a DVD. An example of the second optical information recording medium is an optical information recording medium having a recording surface covered with a transparent substrate having a thickness of about 1.2 mm, e.g., a CD.

Furthermore, for achieving the above-mentioned object, an optical head apparatus of the present invention includes at least an objective lens of the present invention and a photoreceptor that receives light reflected by either the recording surface of the first optical information recording medium or the recording surface of the second optical information recording medium and converts the light into an electric signal.

Furthermore, for achieving the above-mentioned object, an optical information recording/reproducing apparatus according to the present invention includes at least an optical head apparatus of the present invention, and at least one circuit that discriminates between the first optical information recording medium and the second optical information recording medium and also reads information from the electric signal converted by the photoreceptor.

BRIEF DESCRIPTION OF DRAWINGS

FIG. 2A is a cross-sectional view showing the objective lens in the first embodiment and a light beam passing through a DVD as an optical disk. FIG. 2B is a cross-sectional view showing the objective lens in the first embodiment and a light beam passing through a CD as an optical disk.

PREFERRED EMBODIMENT OF THE INVENTION

First Embodiment

Hereinafter, an objective lens, an optical head apparatus and an optical information recording/reproducing apparatus according to a first embodiment will be described below by referring to FIGS. 1-8.

Figure 1:
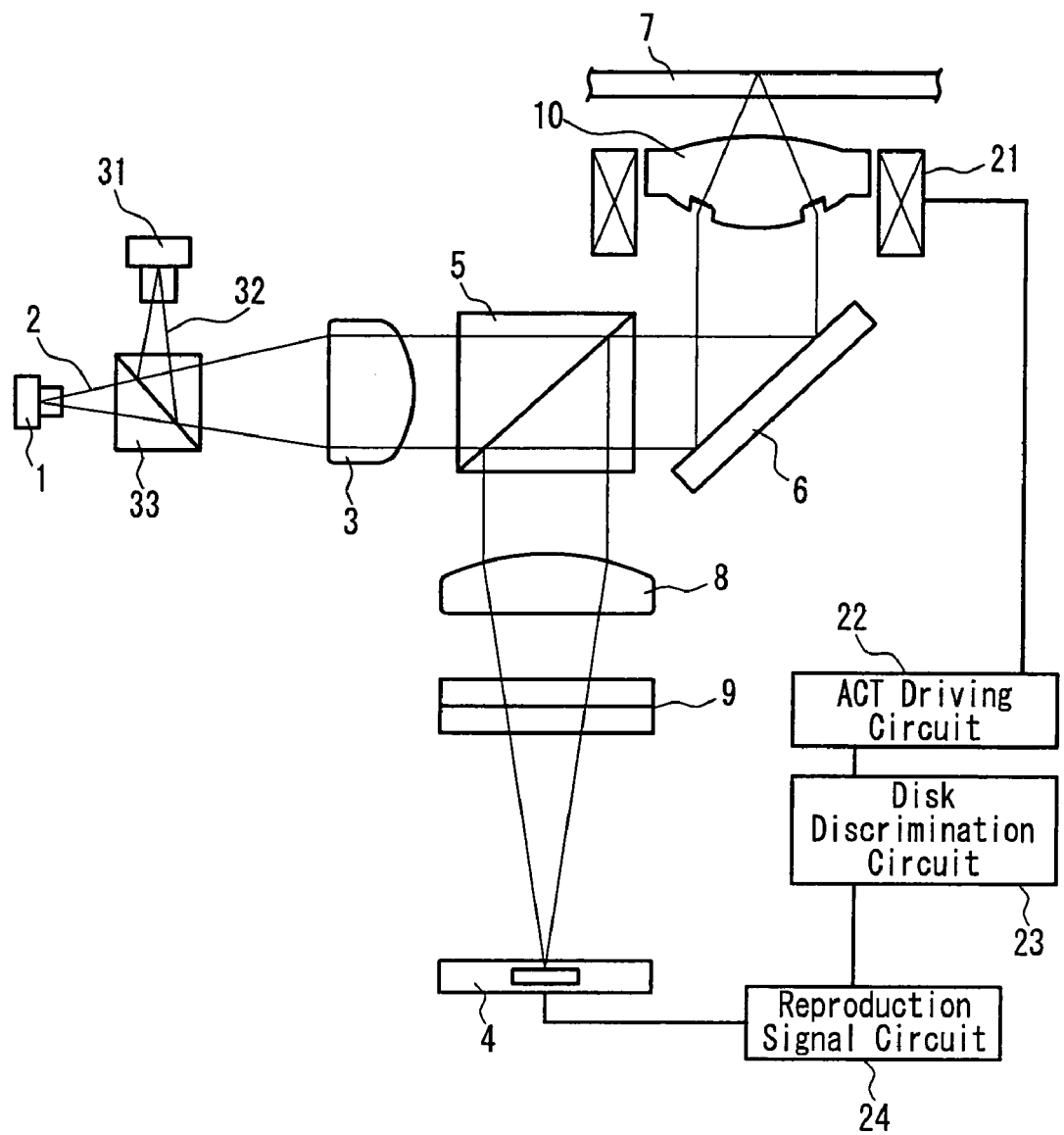
FIG. 1 is a block diagram showing an objective lens, an optical head apparatus and an optical information recording/reproducing apparatus in a first embodiment of the present invention.
Figure 12:
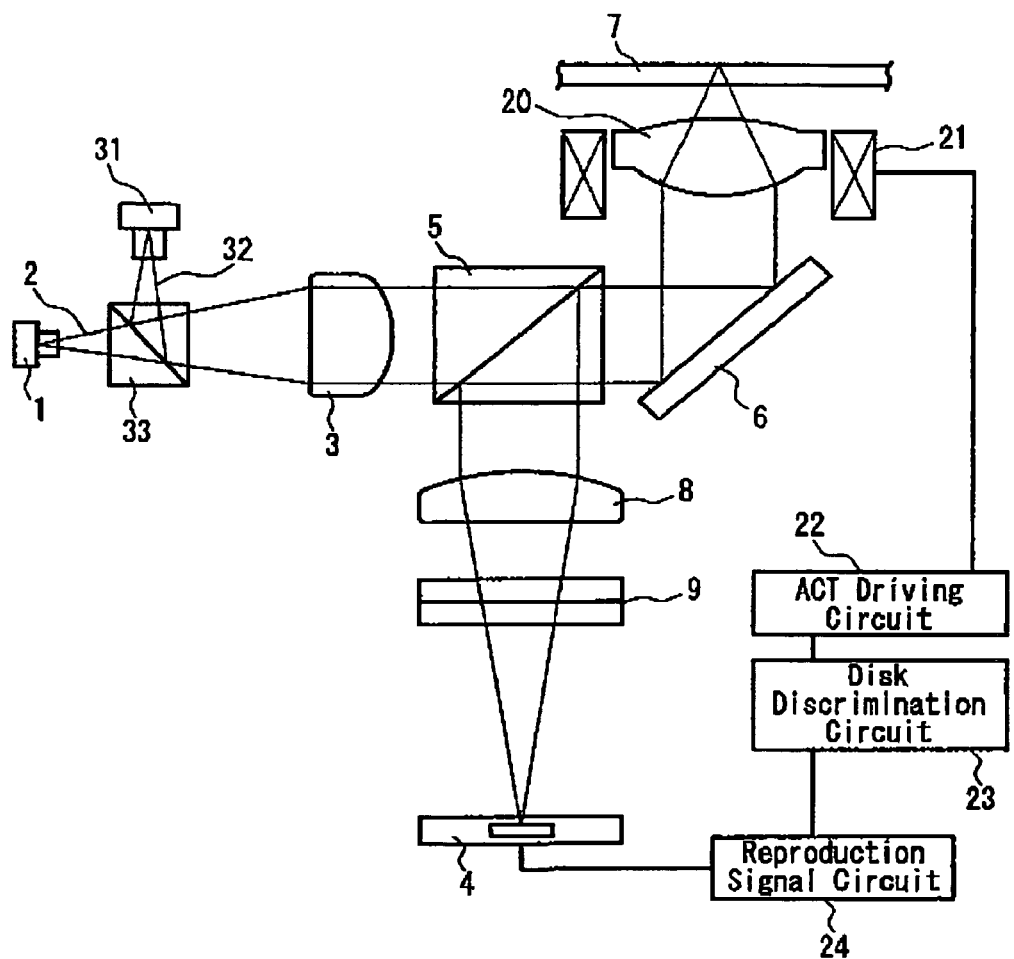
FIG. 12 is a view showing a conventional optical head apparatus and an optical information recording/reproducing apparatus.

FIG. 1 is a block diagram showing an objective lens, an optical head apparatus, and an optical information recording/reproducing apparatus in the first embodiment of the present invention. As illustrated in FIG. 1, the optical head apparatus and the optical information recording/reproducing apparatus of the first embodiment has the same structure as a conventional optical head apparatus and a conventional optical information recording/reproducing apparatus as shown in FIG. 12, except that an objective lens 10 of the first embodiment is used. In FIG. 1, components with marks identical to those in FIG. 12 denote the components common to those shown in FIG. 12.

When the optical disk 7 is a DVD, a light beam 2 having a wavelength of 650 nm is emitted from a semiconductor laser 1, and the light beam 2 passes through a beam splitter 33, a collimator lens 3 and a beam splitter 5 in this order so as to be converged on the optical disk 7 by the objective lens 10. The light beam 2 reflected by the optical disk 7 is reflected further by the beam splitter 5 and received by a photodetector 4.

When the optical disk 7 is a CD, a light beam 32 having a wavelength of 780 nm is emitted from the semiconductor laser 31. The light beam 32 is reflected by the beam splitter 33, and converged on the optical disk 7 by the objective lens 10 in the same manner as the case of the light beam 2 used for a playback of a DVD. Similarly in this case, the light beam 32 reflected by the optical disk 7 is reflected further by the beam splitter 5 and received by the photodetector 4.

The reflected light received by the photodetector 4 is converted into an electric signal and sent to a reproduction signal circuit 24. The reproduction signal circuit 24 reads information selectively from the electric signal in accordance with the type of the optical disk 7 discriminated by a disk discrimination circuit 23.

In the optical head apparatus in the first embodiment, the semiconductor laser 31 is arranged closer by about 2.8 mm to parallel light reflected by the beam splitter 33 in comparison with the optical head apparatus shown in FIG. 12, so that the light emitted from the collimator lens 3 has a micro-divergence. Therefore, in comparison with an optical head apparatus shown in FIG. 12, the optical head apparatus in the first embodiment has an advantage, i.e., it can correct the spherical aberration on a recording surface of a CD.

The objective lens 10 in the first embodiment will be described below by referring to FIGS. 2A and 2B. FIG. 2A is a cross-sectional view showing an objective lens in the first embodiment and a light beam passing through a DVD as an optical disk. FIG. 2B is a cross-sectional view showing an objective lens in the first embodiment and a light beam passing through a CD as an optical disk.

Figure 13A:
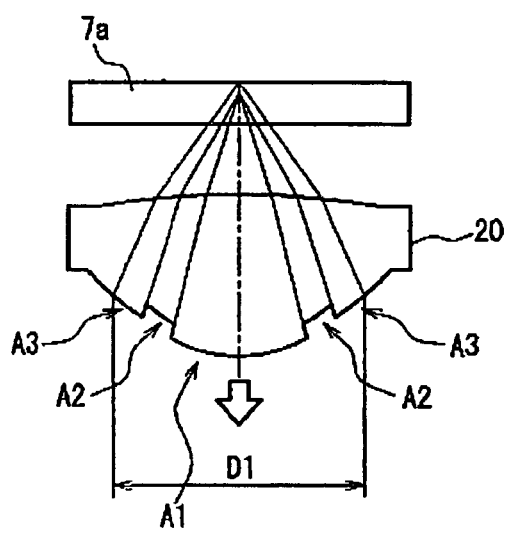
FIG. 13A is a cross-sectional view showing an objective lens shown in FIG. 12 and a light beam passing through a DVD as an optical disk.
Figure 13B:
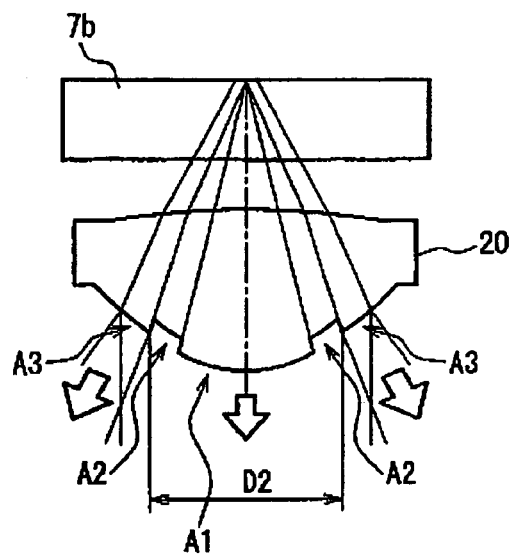
FIG. 13B is a cross-sectional view showing an objective lens shown in FIG. 12 and a light beam passing through a CD as an optical disk.

As shown in FIGS. 2A and 2B, the objective lens 10 in the first embodiment is used, similar to a conventional objective lens (see FIG. 13), for converging a light beam 2 from the semiconductor laser 1 on a recording surface 17a of a DVD covered with a transparent substrate 7a, and also for converging a light beam 32 from the semiconductor laser 31 on a recording surface 17b of a CD covered with a transparent substrate 7b that is thicker than the transparent substrate 7a.

Furthermore, the objective lens 10 in the first embodiment has, on the incident plane for a light beam, a center region A1 for transmitting a central axis of a light beam, an intermediate region A2 formed to surround the center region A1, and a peripheral region A3 formed to surround the intermediate region A2. Alternatively, the center region A1, the intermediate region A2 and the peripheral region A3 can be arranged on the emission plane for a light beam.

Furthermore, the intermediate region A2 has a stepped portion 12 (hereinafter, referred to as 'a phase-stepped portion') between the intermediate region A2 and each of the center region A1 and the peripheral region A3, for causing an advance or a delay of a phase of a light beam passing through the intermediate region A2 with respect to phases of light beams passing through the center region A1 and the peripheral region A3.

As illustrated in FIGS. 2A and 2B, the objective lens 10 in the first embodiment is different from the conventional objective lens (see FIG. 13) in that it has a grating structure (diffraction grating 11) on the lens surface of the intermediate region A2. That is, while a curvature of a lens surface of an intermediate region A2 is optimized only with respect to a disk having a thick transparent substrate covering the recording surface (for example, a CD having a transparent substrate having a thickness of 1.2 mm) in a conventional objective lens, the objective lens 10 of the first embodiment is shaped aspherical due to the diffraction grating 11 formed on the lens surface.

A typical diffraction lens is designed to use a phenomenon that a lens power of a diffraction grating portion is proportional to the wavelength, so that a spherical aberration will be generated when an aspherical lens portion as a base for the diffraction grating portion is provided alone and the spherical aberration is corrected at the diffraction grating portion. In the first embodiment, the intermediate region A2 is designed as described above, and thus the intermediate region A2 is formed to differentiate the thickness of the optimum transparent substrate in accordance with the wavelength of the incident light beam.

Therefore in the objective lens 10 of the first embodiment, a wavefront of a light beam passing through the diffraction grating 11 will be optimized due to the wavelength dependency of the diffraction grating 11 in a case of a playback of a DVD, i.e., transmitting a light beam 2 emitted from the semiconductor laser 1, and a case of a playback a CD, i.e., transmitting a light beam 32 emitted from the semiconductor laser 31.

Namely, since the curvatures of the lens surfaces at the center region A1 and the peripheral region A3 are optimized with respect to the transparent substrate 7a of the DVD during a playback of the DVD, and the spherical aberration of the light beam passing through the intermediate region A2 on the recording surface of the DVD is decreased due to the diffraction grating 11, the thus obtained wavefront will have less spherical aberration on the recording surface of the DVD. Therefore, all of the light beams passing through the lens surface (incident plane) of the objective lens 10 are converged on the recording surface of the DVD, and thus the efficiency of the light beam 2 emitted from the semiconductor laser 1 during a playback of the DVD can be improved in comparison with the conventional one.

During playback of a CD, some spherical aberration will be generated on the recording surface of the CD due to a light beam passing through the center region A1. However similar to the case of a playback of a DVD, the intermediate region A2 is optimized with respect to the transparent substrate 7b (thickness: 1.2 mm) of the CD by the diffraction grating during a playback of the CD.

Therefore, the spherical aberration on the recording surface of the CD generated due to a light beam passing through the center region A1 can be decreased by means of a light beam passing through the intermediate region A2. As mentioned below, the spherical aberration generated on the recording surface of the CD may be suppressed also by the phase-stepped portion in the first embodiment.

In FIG. 2A, 'L' denotes a step amount of the phase-stepped portions 12, 'd' denotes a depth of the diffraction grating 11. In the objective lens 10 of the first embodiment, NA of the intermediate region A2 is set to a range of 0.39 to 0.47. The object of setting a lower limit of NA of the intermediate region A2 to 0.39 is to decrease the wavefront aberration generated on the recording surface of the CD by means of the light beam passing through the center region A1, to a level not affecting the quality of the CD's reproduction signal. That is, since the center region A1 has a curvature optimized with respect to a DVD, a light beam passing through the center region A1 during a playback of a CD may generate a wavefront aberration on the CD recording surface, which must be suppressed.

As mentioned above, the NA of the intermediate region A2 is set not to exceed 0.47. In general, the NA for an intermediate region A2 can be 0.45 or less when considering only a playback of a CD as a disk exclusively used for reading. However, since the first embodiment takes a playback of a CD-R into consideration, the NA for obtaining an optical resolution for a playback of a CD-R must be about 0.47. In other words, though CD-R has been spread rapidly, some disks are low-quality in the reproduction signals, depending on the recording conditions. Improving the NA a little in order to raise the optical resolution is an effective way for compensating the problem.

However, improved NA will cause a reverse effect. That is, the aberration deteriorates when the disk is inclined, making it difficult to play back a disk that rotates with considerable wobbling. Therefore, improving NA will not necessarily lead to improvement of the entire performance.

It is preferable that the NA of the intermediate region A2 is set to a range of 0.39 to 0.45 in a case of using the objective lens 10 of the first embodiment to a system not supposing a playback of a CD-R. It is preferable that the range of the NA is from 0.39 to 0.47 when the objective lens 10 according to the first embodiment is not used for a system supposing a playback of a CD-R.

Unlike the conventional objective lens (see FIG. 13), the phase-stepped portions 12 of the intermediate region A2 in the objective lens 10 of the first embodiment are formed so that the value of the tertiary spherical aberration on the CD's recording surface (see FIG. 2B) becomes a value to secure the quality of the reproduction signal from the CD. Specifically, the jitter value of the reproduction signal is not more than 15%, or preferably not more than 5%. Therefore, unlike the conventional techniques, the objective lens 10 of the first embodiment can suppress deterioration of detection signals during a playback of a CD. The following description is a detailed description about the phase-stepped portions 12.

Figure 3:
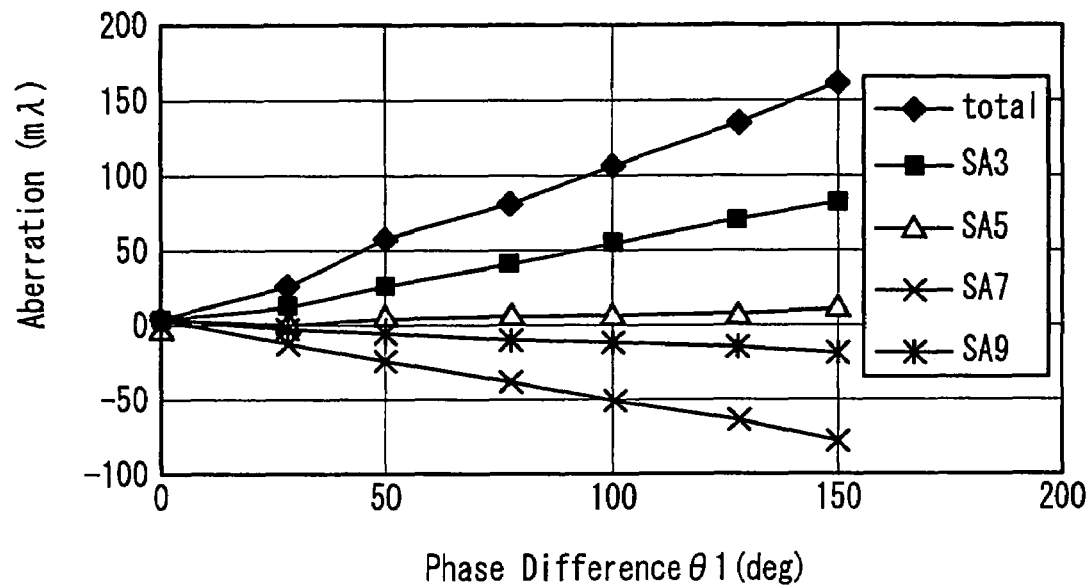
FIG. 3 is a graph showing a relationship between an advance or a delay of a phase of a light beam passing through an intermediate region formed due to the phase-steps and a spherical aberration on a recording surface of a DVD.

First, the influence of the phase-stepped portions 12 during a playback of a DVD will be described below by referring to FIGS. 3 and 4. FIG. 3 is a graph showing a relationship between an advance or a delay of a phase of a light beam passing through an intermediate region formed due to phase-stepped portions and a spherical aberration on the DVD's recording surface. In FIG. 3, the x-axis indicates θ1 (degree), i.e., a delay of a phase of a light beam passing through the intermediate region A2 formed due to the phase-stepped portions 12 (hereinafter, referred to as 'phase difference'). The y-axis indicates a spherical aberration (mλ) on a recording surface of a DVD.

The phase difference θ1 in FIG. 3 is a value based on a phase of a light beam passing through the center region A1 of the objective lens 10. In FIG. 3, the normal direction denotes a direction in which a phase of a light beam passing through the intermediate region A2 is delayed with respect to a phase of a light beam passing through the center region A1. The aberrations in FIG. 3 consist of the spherical aberrations and wavefront aberrations respectively. In FIG. 3, SA3, SA5, SA7 and SA9 respectively denote a tertiary spherical aberration, a fifth order spherical aberration, a seventh order spherical aberration and a ninth order spherical aberration in a Zernike expansion. 'TOTAL' denotes a wavefront aberration.

Figure 4:
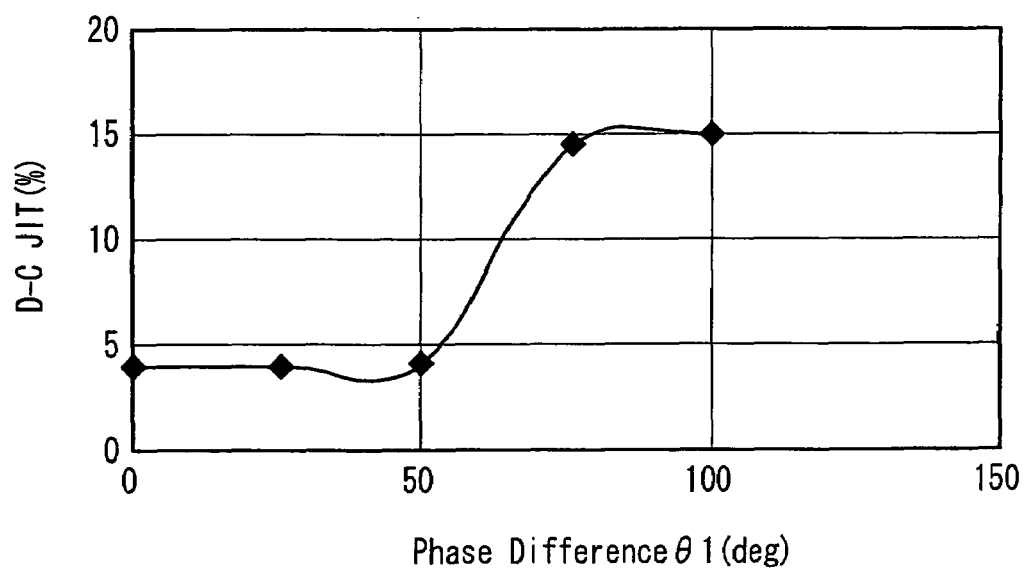
FIG. 4 is a graph showing a relationship between an advance or a delay of a phase of a light beam passing through an intermediate region formed due to the phase-steps and a jitter value of a reproduction signal obtained from a DVD.

FIG. 4 is a graph showing a relationship between an advance or a delay of a phase of a light beam passing through an intermediate region formed due to phase-stepped portions and a jitter value of a reproduction signal obtained from a DVD. In FIG. 4, the x-axis indicates a phase difference θ1 (degree) as in FIG. 3, and the y-axis indicates a jitter value (%) of the reproduction signal obtained from the DVD.

The jitter value indicated in FIG. 4 is an index representing the quality of the reproduction signal. Specifically, it represents unevenness in the reproduction signal from its ideal. A fluctuation of normally distributed reproduction signals is normalized within a window width of a reproduction signal dock. In FIG. 4, 'D-CJIT' is an abbreviation of 'Data to Clock Jitter', and it represents a fluctuation of the reproduction signals from an ideal dock. A typical DVD player is considered as being at an excellent level when the D-CJIT is not more than 5%. A D-CJIT over 15% means a level that error correction is impractical, and the player loses functionality.

As illustrated in FIGS. 3 and 4, the respective aberrations are increased with the increase of the phase difference θ1. When the wavefront aberration (total) is about 50 mλ or less and the tertiary spherical aberration (SA3) is about 30 mλ or less, i.e., until the phase difference θ1 reaches about 50 degrees, the jitter value (D-CJIT) representing the reproduction signal quality does not deteriorate substantially, and thus, the performance of the DVD player is not affected substantially.

This fact shows that from a viewpoint of a playback of a DVD, the phase-stepped portions 12 are formed so that the tertiary spherical aberration (SA3) is about 30 mλ or less, i.e., the phase difference θ1 satisfies the following formula (1). In the formula (1), M1 is an integer.

$$M1 \times 360 \text{ degrees} - 50 \text{ degrees} < \theta1 < M1 \times 360 \text{ degrees} + 50 \text{ degrees} \quad (1)$$

Figure 5:
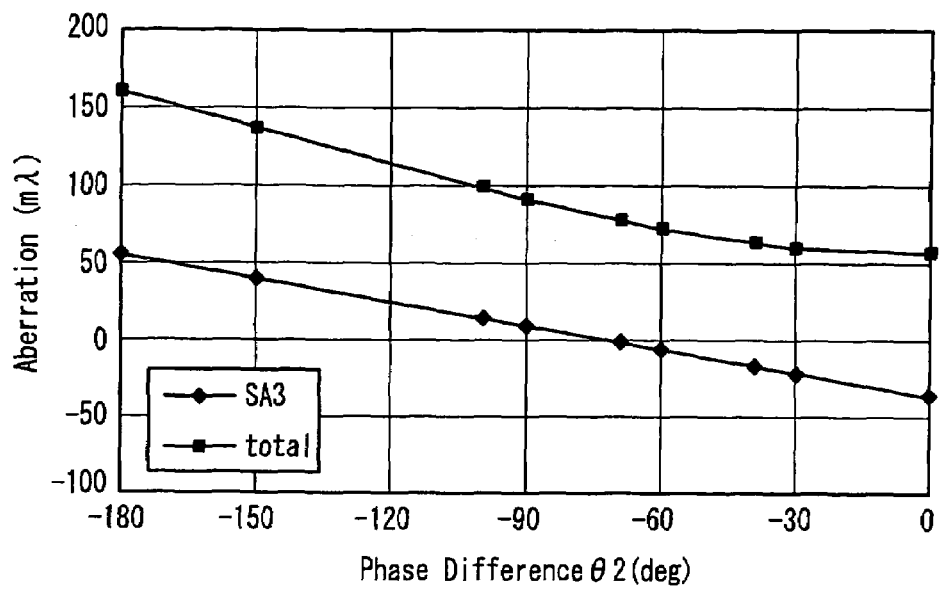
FIG. 5 is a graph showing a relationship between an advance or a delay of a phase of a light beam passing through an intermediate region formed due to the phase-steps and a spherical aberration on a recording surface of a CD.

Next, the influence of the phase-stepped portions 12 during a playback of a CD is described below by referring to FIGS. 5 and 6. FIG. 5 is a graph showing a relationship between an advance or a delay of a light beam passing through an intermediate region formed by phase-stepped portions and a spherical aberration on a recording surface of a CD.

In FIG. 5, the x-axis indicates a phase difference θ2 (degree) in a case of emitting a laser beam having a wavelength of 780 nm from a semiconductor laser 31, and the y-axis indicates a spherical aberration (mλ) on a recording surface of a CD. The phase difference θ2 in FIG. 5 is also based on a phase of a light beam passing through the center region A1 of the objective lens 10, and the normal direction denotes a direction in which a phase of a light beam passing through the intermediate region A2 is delayed with respect to a phase of a light beam passing through the center region A1. The aberrations shown in FIG. 5 are a tertiary spherical aberration (SA3) in a Zernike expansion and a wavefront aberration (TOTAL).

Figure 6:
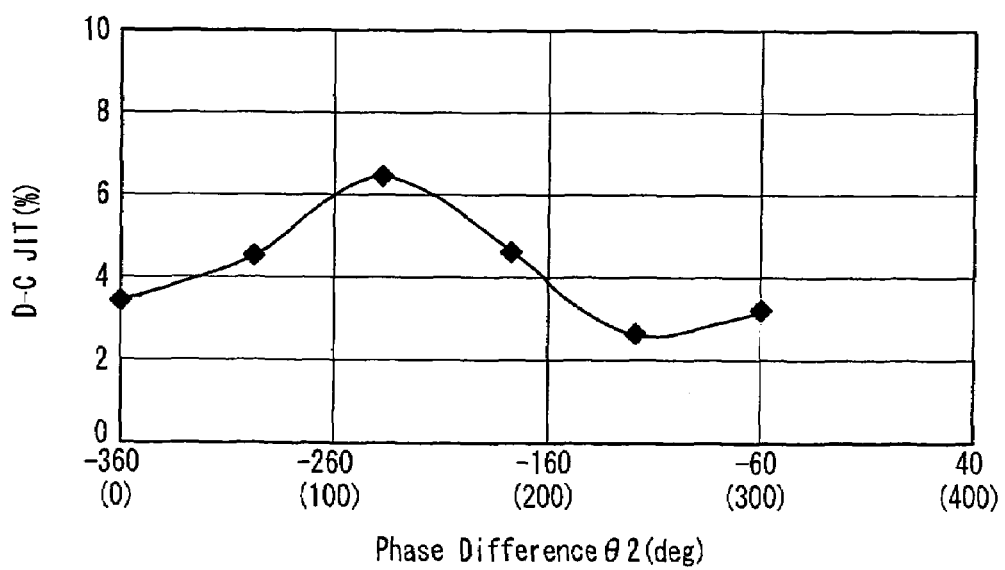
FIG. 6 is a graph showing a relationship between an advance or a delay of a phase of a light beam passing through an intermediate region formed due to the phase-steps and a jitter value of a reproduction signal obtained from a CD.

FIG. 6 is a graph showing a relationship between an advance or a delay of a phase of a light beam passing through an intermediate region formed due to phase-stepped portions and a jitter value of a reproduction signal obtained from a CD. The x-axis in FIG. 6 indicates a phase difference θ2 (degree) as in FIG. 5 and the y-axis indicates a jitter value (%) of a reproduction signal obtained from a CD.

The jitter value shown in FIG. 6 is an index to represent the quality of the reproduction signal, or specifically, it represents unevenness in the reproduction signal from its ideal. A fluctuation of the reproduction signal in a normal distribution is normalized within a window width of a reproduction signal clock. 'D-CJIT' in FIG. 6 is an abbreviation of 'Data to Clock Jitter'. A CD player is considered as being at an excellent level when the D-CJIT is not more than 5%. A D-CJIT over 15% means a level that error correction is impractical, and the player loses functionality.

As shown in FIGS. 5 and 6, when the phase difference θ2 is set substantially in a range of −160 degrees (200 degrees) to −60 degrees (300 degrees), the tertiary spherical aberration has an absolute value of about 30 mλ or less, and the jitter value is lower than 4%. This fact shows that from a viewpoint of a playback of a CD, it is preferable to form the phase-stepped portions 12 so that the tertiary spherical aberration (SA3) is about 30 mλ or less, i.e., the phase difference θ2 satisfies the following formula (2). In the formula (2), M2 is an integer.

$$M2 \times 360 \text{ degrees} - 160 \text{ degrees} < \theta2 < M2 \times 360 \text{ degrees} - 60 \text{ degrees} \quad (2)$$

Since the tertiary spherical aberration and a focus offset relate to each other, it is considered as preferable to form phase-stepped portions to minimize the absolute value of the tertiary spherical aberration on the recording surface of a CD for the purpose of suppressing a focus offset of the CD and further improving the performance of the CD player. Furthermore, as shown in FIG. 3, the tertiary spherical aberration the recording surface of a CD has a minimum absolute value when the phase difference θ2 is −70 degrees. Therefore, in light of the above formula (2), it is most preferable in the first embodiment to set the phase difference θ2 during a playback of the CD to satisfy the following formula (3).

$$\theta2 = M2 \times 360 \text{ degrees} - 70 \text{ degrees} \quad (3)$$

In this case, when considering the phase difference θ1 during a playback of the DVD, a most preferable embodiment here is to form the phase-stepped portions 12 so as to satisfy the above formulas (1) and (3). Thus, M1 and M2 can be set so that the phase difference θ2 obtained by the above formula (3) is included in the range represented by the formula (1). In the first embodiment, M1=−4, and M2=−3.

Here, the phase differences θ1 and θ2 can be adjusted by adjusting the step amount L of each phase-stepped portion 12 (see FIG. 2A). The step amount L can be calculated using the following formula (4). In the formula (4), θ denotes a phase difference, λ denotes a wavelength of a light beam passing through the intermediate region A2, and 'n' denotes a refractive index in the intermediate region A2. As shown in FIG. 2A, the step amount L in the first embodiment denotes a distance between a lens surface of the center region A1 (or a lens surface of the peripheral region) and a virtual plane including a peak of the diffraction grating.

$$L = \theta \times \lambda / ((n-1) \times 360) \quad (4)$$

Therefore, since the wavelength (λ2) of the laser beam entering the intermediate region A2 is 780 nm, the phase difference θ2=−3×360 degrees−70 degrees and n (=n2)=1.535798, the optimum step amount L during a playback of a CD can be represented as θ2×λ2/((n2−1)×360) in light of the above formula (4), and the dimension is about 4.7 μm.

The following description concerns an examination of a phase difference θ1 that makes the optimum step amount L during a playback of a DVD about 4.7 μm. Since the wavelength (λ1) of a laser beam entering the intermediate region A2 is 650 nm and n (=n1)=1.539481, L=θ1×λ1/((n1−1)×360) based on the above formula (4). Therefore, when the phase difference θ1=−4×360 degrees+54 degrees, the step amount L is 4.7 μm.

Figure 7:
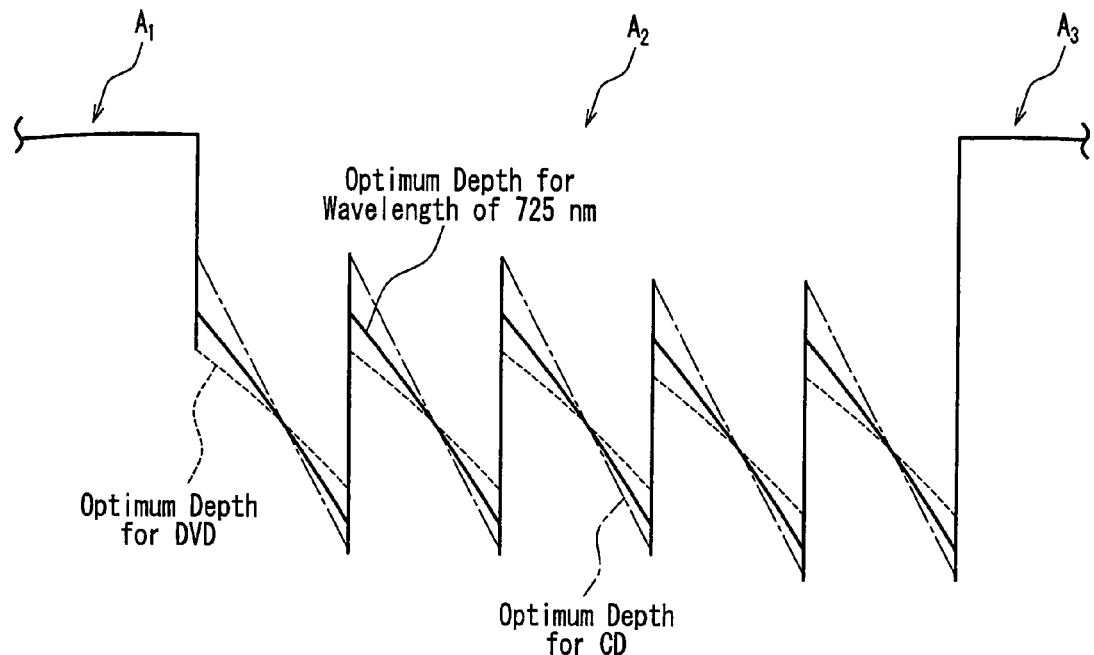
FIG. 7 is an enlarged cross-sectional view showing a diffraction grating shown in FIG. 2A.

However, since the depth d of the diffraction grating 11 is represented as $\lambda/(n-1)$, the optimum depths are different from each other between a DVD and a CD different from each other in the wavelength, as shown in FIG. 7. Here, $\lambda$ denotes a wavelength of a light beam entering the diffraction grating 11 and 'n' denotes a refractive index of the diffraction grating 11. FIG. 7 is an enlarged cross-sectional view showing the diffraction grating shown in FIG. 2A.

Figure 8:
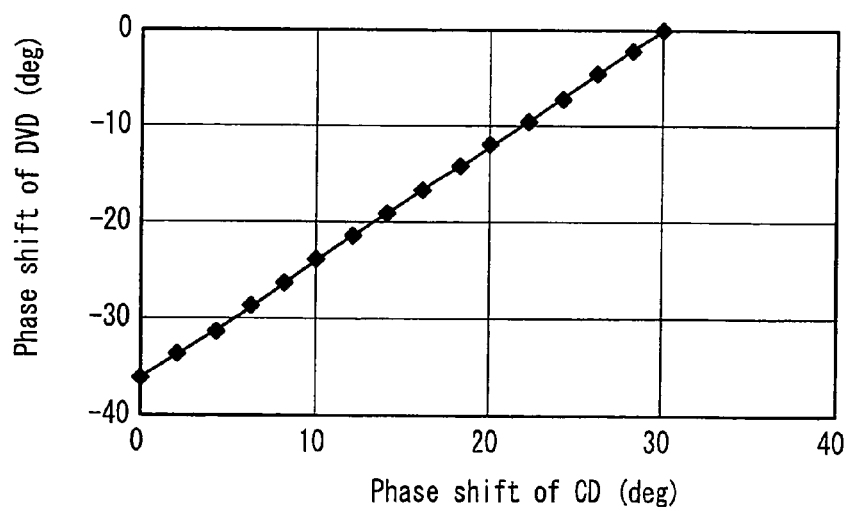
FIG. 8 is a graph showing a relationship between a phase of a light beam during a playback of a DVD and a phase of a light beam during a playback of a CD.

For this reason, for example, when a diffraction grating is designed by setting the depth d of the diffraction grating to correspond to a DVD, a phase of a light beam passing through the intermediate region A2 during a playback of a CD is delayed by about 30 degrees with respect to a phase of a light beam passing through the intermediate region A2 during a playback of a DVD. This relationship is shown in the graph of FIG. 8. FIG. 8 is a graph showing a relationship between a phase of a light beam during a playback of a DVD and a phase of a light beam during a playback of a CD.

In light of the relationship as shown in FIG. 8, it is preferable to set the phase differences $\theta 1$ and $\theta 2$ to be optimum with respect to both the DVD and CD and to set the step amount L and the depth d of the diffraction grating on the basis thereof.

Here, when a set wavelength of the diffraction grating in the first embodiment is adapted to the wavelength of the laser beam for playing a CD, the phase difference $\theta 2$ during a playback of a CD is represented as ($-3 \times 360$ degrees$-70$ degrees). Since the phase is advanced by about 35 degrees for a DVD as shown in FIG. 8, the phase difference $\theta 1$ during a playback of a DVD is represented as follows.

$$\theta 1 = -3 \times 360 \text{ degrees} - (306 + 35) \text{ degrees} \quad (5)$$
$$= -3 \times 360 \text{ degrees} - 341 \text{ degrees}$$
$$= -4 \times 360 \text{ degrees} + 19 \text{ degrees}$$

When setting the phase differences $\theta 1$ and $\theta 2$ as described above, the tertiary spherical aberration (SA3) during a playback of a CD becomes zero, as shown in FIG. 5. Furthermore, the formula (5) satisfies the formula (1) and demonstrates that a phase of a light beam passing through the intermediate region A2 is advanced by 19 degrees during a playback of a DVD, the thus obtained wavefront on the recording surface of the DVD will have less aberration as shown in FIG. 3. The step amount L in this case is about 4.6 μm.

As mentioned above, by using the objective lens according to the first embodiment, reproduction performance for a CD can be improved without deterioration in the performance in playing a DVD. During a playback of a CD, a large spherical aberration is generated in a light beam passing through the peripheral region A3, among the light beams reflected on the recording surface of the CD. However, since this light beam does not contribute to the reproduction signal, the reproduction signal will not deteriorate.

Second Embodiment

In the following, an objective lens, an optical head apparatus and an optical information recording/reproducing apparatus according to a second embodiment will be described by referring to FIGS. 9-11.

Figure 9:
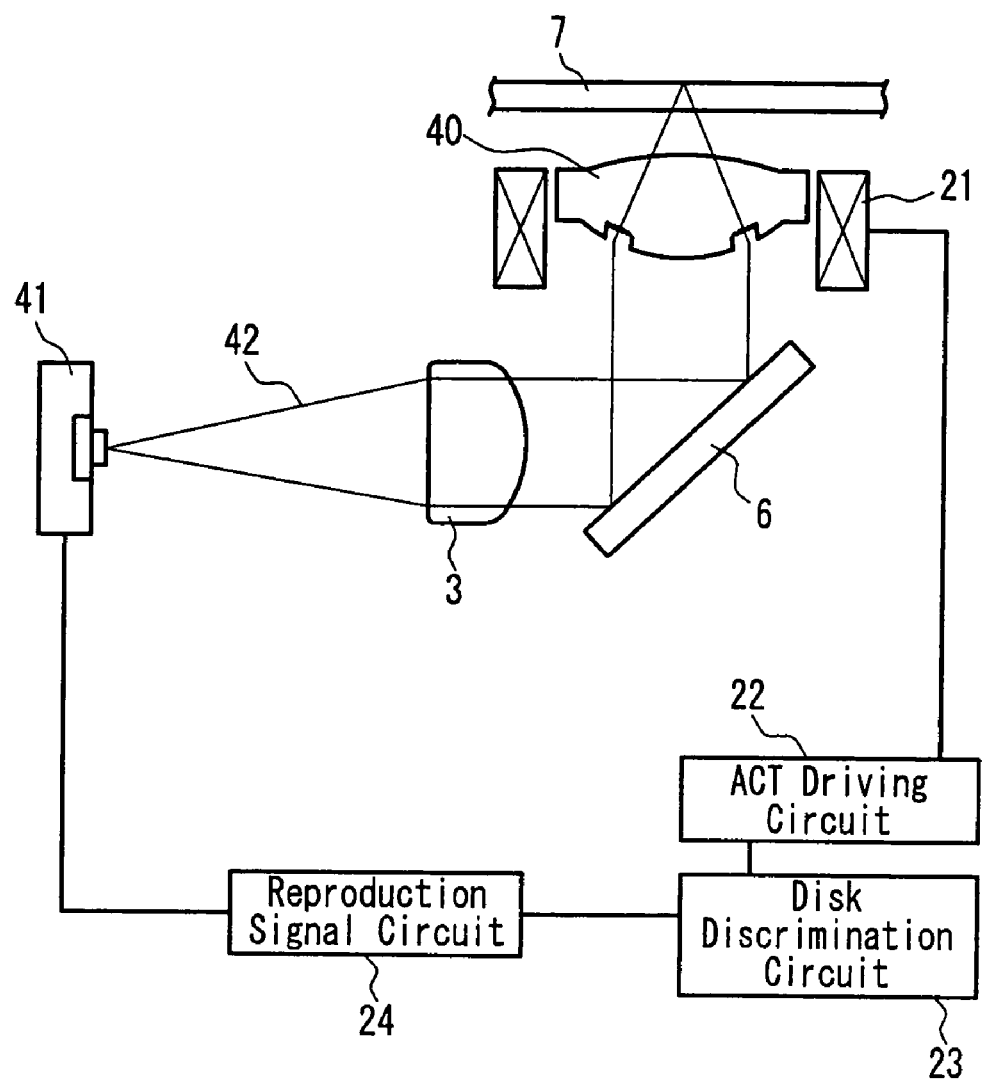
FIG. 9 is a block diagram showing an objective lens, an optical head apparatus and an optical information recording/reproducing apparatus in a second embodiment of the present invention.

FIG. 9 is a block diagram showing an objective lens, an optical head apparatus and an optical information recording/reproducing apparatus according to the second embodiment.

As illustrated in FIG. 9, the second embodiment is clearly distinguished from the first embodiment in that the optical head apparatus and the optical information recording/reproducing apparatus of the second embodiment has a dual wavelength laser unit 41 in place of the semiconductor laser 1, the semiconductor laser 31 and the photodetector 4 used in the optical head apparatus and the optical information recording-reproducing apparatus of the first embodiment. The dual wavelength laser unit 41 is formed by integrally combining a monolithic dual wavelength laser and a photodetector.

The monolithic dual wavelength laser provided to the dual wavelength laser unit 41 has two light-emitting points for a DVD and for a CD on one chip, and the light-emitting points are spaced from each other by about 100 μm. A distance from a light-emitting point to a collimator is set to be equal for a DVD and for a CD. Therefore, while the optical system for playing a CD is a diffusion optical system in the first embodiment, the optical system for playing a CD is a parallel optical system as well in the second embodiment.

In the optical head apparatus according to the second embodiment, when the optical disk 7 is a DVD, a light beam 42 having a wavelength of 650 nm is emitted from the dual wavelength laser unit 41. The light beam 42 passing through the collimator lens 3 is reflected by a mirror 6 and converged on a recording surface of the optical disk 7 by an objective lens 40. Light reflected on the recording surface of the optical disk 7 travels along the same optical path so as to be received by the dual wavelength laser unit 41.

When the optical disk 7 is a CD, a light beam 42 having a wavelength of 780 nm is emitted from the surface of the same chip emitting the light beam 42 having the above-mentioned wavelength of 650 nm. Similar to the case of a DVD, the light beam 42 having the wavelength of 780 nm is converged on a recording surface of a CD by the objective lens 40 and reflected, and the reflected light is received by the dual wavelength laser unit 41.

As shown in FIG. 9, a center region, an intermediate region and a peripheral region are formed on the incident plane of the objective lens 40 of the second embodiment. A diffraction grating is formed on the lens surface of the intermediate region, and phase-stepped portions are formed between the intermediate region and a center region, and also between the intermediate region and the peripheral region.

The thus configured objective lens 40 of the second embodiment enables all light beams passing through the lens surface (incident surface) to be converged on a recording surface of a DVD, so that the efficiency of the light beam 42 can be improved during a playback of the DVD in comparison with a conventional technique.

For the objective lens 40 according to the second embodiment, the phase-stepped portions are formed so that the value of the tertiary spherical aberration on the recording surface of a CD becomes a value to secure the quality of the reproduction signal from the CD. Therefore, the objective lens 40 according to the second embodiment can be used as well to suppress deterioration of a detection signal during a playback of a CD.

However, since the optical system of the optical head apparatus in the second embodiment differs from the optical system in the first embodiment, the objective lens 40 is distinguished from the objective lens 10 in the first embodiment in the phase differences $\theta 1$, $\theta 2$ and a value of the step amount L. The following description refers to phase-stepped portions in the objective lens 40 according to the second embodiment.

The influence of the phase-stepped portions during a playback of the CD provided to the objective lens 40 of the second embodiment will be described below by referring to FIGS. 10 and 11. FIG. 10 is a graph showing a relationship between an advance or a delay of a phase of a light beam passing through an intermediate region formed by the phase-stepped portions and a spherical aberration on a recording surface of a CD.

Figure 10:
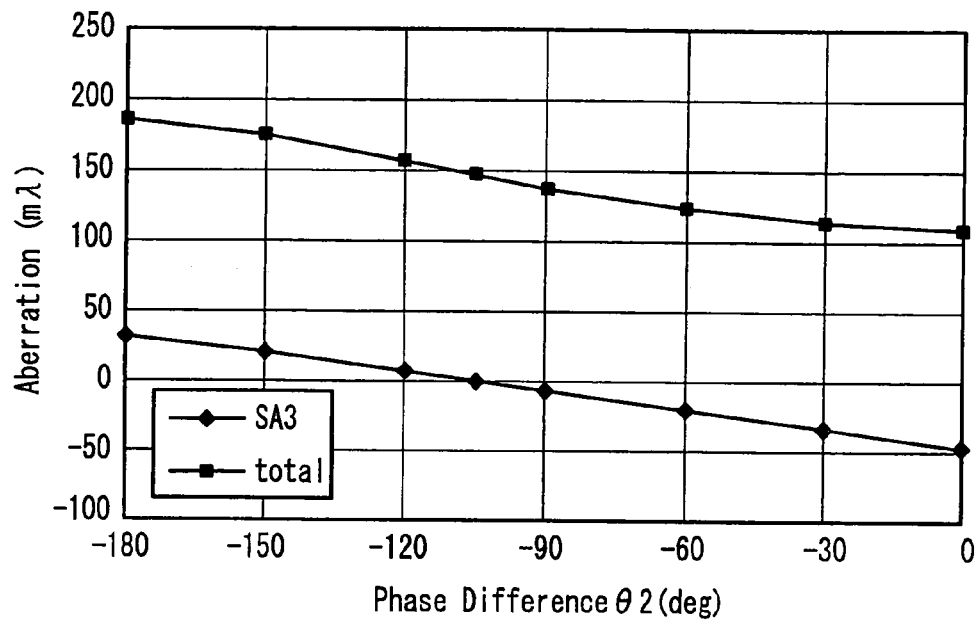
FIG. 10 is a graph showing a relationship between an advance or a delay of a phase of a light beam passing through an intermediate region formed due to the phase-steps and a spherical aberration on a recording surface of a CD.

A graph in FIG. 10 is similar to the graph shown in FIG. 5. The x-axis indicates a phase difference θ2 (degree) in a case of emitting a laser beam having a wavelength of 780 nm from the dual wavelength laser unit 41, while the y-axis indicates a spherical aberration (mλ) on a recording surface of a CD. The phase difference θ2 in FIG. 10 indicates a value based on a phase of a light beam passing through the center region of the objective lens 40, and the normal direction denotes a direction in which a phase of a light beam passing through the intermediate region is delayed with respect to a phase of a light beam passing through the center region. Aberrations shown in FIG. 10 are a tertiary spherical aberration (SA3) in a Zernike expansion and a wavefront aberration (TOTAL).

Figure 11:
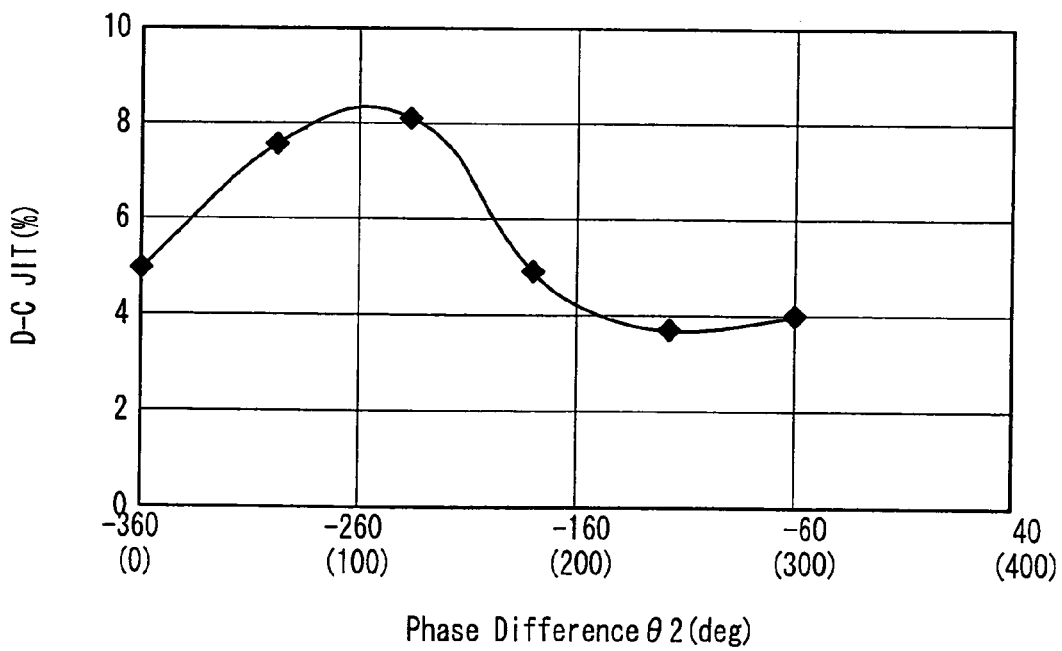
FIG. 11 is a graph showing a relationship between an advance or a delay of a phase of a light beam passing through an intermediate region formed due to the phase-steps and a jitter value of a reproduction signal obtained from a CD.

FIG. 11 is a graph showing a relationship between an advance or a delay of a phase of a light beam passing through the intermediate region formed due to phase-stepped portions and a jitter value of a reproduction signal obtained from a CD. Similar to the graph shown in FIG. 6, the x-axis in FIG. 11 indicates a phase difference θ2 (degree) as in FIG. 10, and the y-axis indicates a jitter value (%) of a reproduction signal obtained from a CD. Similar to the jitter value shown in FIG. 6, the jitter value shown in FIG. 11 is an index to represent the quality of the reproduction signal. Specifically, it represents unevenness in the reproduction signal from its ideal. A fluctuation of the reproduction signal normally distributed is normalized within a window width of a reproduction signal clock.

As shown in FIGS. 10 and 11, when the phase difference θ2 is set substantially in a range of −160 degrees (200 degrees) to −60 degrees (300 degrees), the tertiary spherical aberration has an absolute value of about 30 mλ or less, and the jitter value is lower than 4%. This fact shows that from a viewpoint of a playback of a CD, the phase-stepped portions are formed so that the tertiary spherical aberration (SA3) is about 30 mλ or less, i.e., the phase difference θ2 satisfies the above formula (2).

In the second embodiment, the optical system during a playback of a DVD is a parallel optical system as in the first embodiment, and thus, similar to the first embodiment, it is preferable that the phase difference θ1 during a playback of the DVD is set to satisfy the above formula (1).

In the first embodiment, the phase difference θ2 minimizing the absolute value of the tertiary spherical aberration on the recording surface of a CD is about −70 degrees. As shown in FIG. 10, the absolute value of the tertiary spherical aberration in the second embodiment will be minimized when the phase difference θ2 is about −105 degrees. Therefore, it is most preferable in the second embodiment that the phase difference θ2 during a playback of a CD is set to satisfy the following formula (6) in light of the formula (2).

$$\theta2 = M2 \times 360 \text{ degrees} - 105 \text{ degrees} \qquad (6)$$

As mentioned above, preferred values of the phase differences θ2 differ between the first and second embodiments, since, during a playback of a CD, the optical system in the second embodiment becomes a parallel optical system, while the optical system in the first embodiment becomes a diffusion optical system, thereby the amount of the spherical aberrations to be corrected will differ between the first embodiment and the second embodiment.

In the second embodiment, it is most preferable that the phase-stepped portions are formed to satisfy the above formulas (1) and (6). In this manner, M1 and M2 can be set so that the phase difference θ2 obtained by using the above-formula (6) is included in the range represented by the above formula (1), and thus M1=−4 and M2=−3 in the second embodiment.

In the second embodiment, the step amount L can be calculated by using the above formula (4). Therefore, since the wavelength (λ2) of the laser beam entering the intermediate region A2 is 780 nm, the phase difference θ2=−3×360 degrees−105 degrees and n (=n2)=1.535798, the optimum step amount L during a playback of a CD can be represented in light of the above formula (4), as θ2×λ2/((n2−1)×360), and the dimension is about 4.8 μm.

The following description is about an examination of a phase difference θ1 that makes the optimum step amount L during a playback of a DVD about 4.8 μm. Since the wavelength (λ1) of a laser beam entering the intermediate region A2 is 650 nm and n (=n1)=1.539481, L=θ1×λ1/((n1−1)×360) based on the above formula (4). Therefore, when the phase difference θ1=−4×360 degrees−12 degrees, the step amount L is 4.8 μm.

However, similar to the first embodiment, since the depth d of the diffraction grating 11 in the second embodiment is represented as λ/(n−1), the optimum depths are different from each other between a DVD and a CD different from each other in the wavelength, as shown in FIG. 7. Here, λ denotes a wavelength of a light beam entering the diffraction grating 11 and 'n' denotes a refractive index of the diffraction grating 11. In the second embodiment, for example, when a diffraction grating in the second embodiment is designed by setting the depth d of the diffraction grating to correspond to a DVD, a phase of a light beam passing through the intermediate region A2 during a playback of a CD is delayed by about 30 degrees with respect to a phase of a light beam passing through the intermediate region A2 during a playback of a DVD (see FIG. 8).

Similar to the first embodiment, it is preferable in the second embodiment, in light of the relationship as shown in FIG. 8, to set the phase differences θ1 and θ2 to be optimum with respect to both the DVD and CD and to set the step amount L and the depth d of the diffraction grating on the basis thereof.

When a set wavelength of the diffraction grating in the second embodiment is 725 nm, i.e., a midpoint between a wavelength of a laser beam for playing a DVD and a wavelength of a laser beam for playing a CD, the phase will be delayed by 15 degrees for the CD while the phase is advanced by 18 degrees for the DVD. Therefore, the phase difference θ1 during a playback of a DVD is represented in the formula (7) below. The phase difference θ2 during a playback of a CD is represented in the formula (8) below.

$$\theta1 = -4 \times 360 \text{ degrees} - (12-18) \text{ degrees} \qquad (7)$$
$$= -4 \times 360 \text{ degrees} - 6 \text{ degrees}$$

$$\theta2 = -3 \times 360 \text{ degrees} - (105-15) \text{ degrees} \qquad (8)$$
$$= -3 \times 360 \text{ degrees} - 90 \text{ degrees}$$

When setting the phase differences θ1 and θ2 as described above, the tertiary spherical aberration (SA3) during a playback of a CD becomes zero, as shown in FIG. 10.

Furthermore, the formula (7) demonstrates that if a phase of a light beam passing through the intermediate region A2 is advanced by 6 degrees during a playback of a DVD, the thus obtained wavefront on the recording surface of the DVD will have less aberration as shown in FIG. 3. The step amount L in this case is about 4.8 μm. Here, the formula (7) satisfies the formula (1), and the formula (8) satisfies the formula (1).

As mentioned above, by using the objective lens according to the second embodiment, reproduction performance for a CD can be improved without deterioration in the performance in playing a DVD. During a playback of a CD, a large spherical aberration is generated in a light beam passing through the peripheral region A3, among the light beams reflected on the recording surface of the CD, as in the first embodiment. However, since this light beam does not contribute to the reproduction signal, the reproduction signal will not deteriorate.

As mentioned above, the first and second embodiments refer exclusively to objective lenses applicable to a CD and a DVD, but the embodiments are not limited to the examples. Objective lenses according to the present invention can be applied to two types of disks different from each other in the thickness of transparent substrates covering recording surfaces.

INDUSTRIAL APPLICABILITY

As mentioned above, an objective lens, an optical head apparatus and an optical information recording/reproducing apparatus of the present invention can use, during a playback of a DVD, light beams that pass through an intermediate region, thereby improving optical efficiency, while such light beams have been used conventionally only for a playback of a CD. Moreover, since stepped portions are formed between the intermediate region and the center region and also between the intermediate region and the peripheral region so as to prevent deterioration of optical efficiency and the DVD characteristics, and also to decrease a spherical aberration on a recording surface of the CD during a playback of a CD, quality of a detection signal during a playback of a CD can be improved in comparison with a conventional technique.

The invention claimed is:

1. An objective lens for converging a light beam emitted from a first light source on a recording surface of a first optical information recording medium covered with a transparent substrate, and for converging a light beam that is emitted from a second light source and different in the wavelength from the light beam emitted from the first light source on a recording surface of a second optical information recording medium covered with a transparent substrate thicker than the transparent substrate on the first optical information recording medium, wherein the objective lens comprises, on any of an incident plane or an emission plane for the two light beams, a center region where center axes of the two light beams pass through, an intermediate region formed to surround the center region, and a peripheral region formed to surround the intermediate region, the intermediate region has a diffraction structure on its lens surface and stepped portions at boundaries with the center region and the peripheral region, and the stepped portions causes an advance or a delay of a phase of a light beam passing through the intermediate region with respect to the light beams passing through the center region and the peripheral region, the stepped portions are formed so that a value of a tertiary spherical aberration on a recording surface of the second optical information recording medium is more than −30 mλ and less than −30 mλ, such that a jitter value of a reproduction signal from the second optical information recording medium not more than 15%.

2. The objective lens according to claim 1, wherein the jitter value of the reproduction signal from the second optical information recording medium is not more than 5%.

3. The objective lens according to claim 1, satisfying the following formula (1):

$$M1 \times 360 \text{ degrees} - 50 \text{ degrees} < \theta1 < M1 \times 360 \text{ degrees} + 50 \text{ degrees} \quad (1)$$

where θ1 denotes an advance or a delay of a light beam passing through the intermediate region formed due to the stepped portions when converging the light beam from the first light source on the recording surface of the first light information recording medium, and M1 in the formula (1) is an integer.

4. The objective lens according to claim 3, wherein M1=−4 in the formula (1).

5. The objective lens according to claim 1, satisfying the following formula (2):

$$M2 \times 360 \text{ degrees} - 160 \text{ degrees} < \theta2 < M2 \times 360 \text{ degrees} - 60 \text{ degrees} \quad (2)$$

where θ2 denotes an advance or a delay of a light beam passing through the intermediate region formed due to the stepped portions when converging the light beam from the second light source on a recording surface of the second light information recording medium, and M2 in the formula (2) is an integer.

6. The objective lens according to claim 5, wherein M2=−3 in the formula (2).

7. The objective lens according to claim 1, wherein the transparent substrate covering the recording surface of the first optical information recording medium has a thickness of about 0.6 mm, and the transparent substrate covering the recording surface of the second optical information recording medium has a thickness of about 1.2 mm.

8. The objective lens according to claim 1, wherein a numerical aperture in the intermediate region is from 0.39 to 0.47.

9. An optical head apparatus at least comprising an objective lens according to claim 1, and a photoreceptor that receives light reflected by either the recording surface of the first optical information recording medium or the recording surface of the second optical information recording medium and converts the light into an electric signal.

10. An optical information recording/reproducing apparatus comprising at least the optical head apparatus according to claim 9, and at least one circuit that discriminates between the first optical information recording medium and the second optical information recording medium and also reads information from the electric signal converted by the photoreceptor.

* * * * *

UNITED STATES PATENT AND TRADEMARK OFFICE
CERTIFICATE OF CORRECTION

PATENT NO. : 7,283,451 B2
APPLICATION NO. : 10/473934
DATED : October 16, 2007
INVENTOR(S) : Kikuchi et al.

It is certified that error appears in the above-identified patent and that said Letters Patent is hereby corrected as shown below:

Column 9, line 12: "dock" should read --clock--.
Column 9, line 14: "dock" should read --clock--.
Column 9, line 14: "Atypical" should read --A typical--.
Column 10, line 26: "the recording" should read --on the recording--.
Column 12, line 1: "dearly" should read --clearly--.
Column 16, line 8 (claim 1): "less than -30" should read --less than 30--.
Column 16, line 10 (claim 1): "medium not" should read --medium is not--.

Signed and Sealed this

Twenty-first Day of October, 2008

JON W. DUDAS
*Director of the United States Patent and Trademark Office*